United States Patent [19]

Ozawa

[11] Patent Number: 5,895,865

[45] Date of Patent: Apr. 20, 1999

[54] PARTICULATE MATERIAL FLOW MEASURING DEVICE

[76] Inventor: Kenneth Y. Ozawa, 117 Hill St., Ontario, Oreg. 97914

[21] Appl. No.: 08/932,874

[22] Filed: Sep. 18, 1997

[51] Int. Cl.$^6$ ........................................................ G01F 1/30
[52] U.S. Cl. ........................................................ 73/861.73
[58] Field of Search ........................................... 73/861.73

[56] References Cited

U.S. PATENT DOCUMENTS

| | | | |
|---|---|---|---|
| 3,269,181 | 8/1966 | Seay | 73/861.73 |
| 3,640,136 | 2/1972 | Nolte | 73/861.73 |
| 3,945,532 | 3/1976 | Marks | 73/861.73 |
| 4,354,622 | 10/1982 | Wood | 73/861.73 |
| 4,637,262 | 1/1987 | Vesa | 73/861.73 |
| 5,065,632 | 11/1991 | Reuter | 73/861.73 |
| 5,335,554 | 8/1994 | Kempf et al. | 73/861.73 |
| 5,560,246 | 10/1996 | Bottinger et al. | 73/861.73 |
| 5,681,999 | 10/1997 | Pollano et al. | 73/861.73 |
| 5,698,794 | 12/1997 | Bussian | 73/861.73 |

FOREIGN PATENT DOCUMENTS

| | | | |
|---|---|---|---|
| 1086-346 | 4/1984 | U.S.S.R. | 73/861.73 |
| 1714370 | 2/1992 | U.S.S.R. | 73/861.73 |

*Primary Examiner*—Harshad Patel
*Assistant Examiner*—Jewel V. Thompson
*Attorney, Agent, or Firm*—Christensen O'Connor Johnson & Kindness PLLC

[57] ABSTRACT

A load scale mountable onto a vertical conduit for measuring the mass flow rate of particulate solids. The load scale includes an outer vertical housing (H), and an inner sleeve (30) that has a central axis of symmetry (C). A feed manifold (T) is located above an inlet (32) of the sleeve (30) so that particulate feed is channeled through a slide gate (20) into the inner sleeve (30). A particulate deflector (40) with a surface (42) that has rotational symmetry about a vertical axis (C), and that is shaped to guide particulate solids outward from a central apex (44) at its upper extremity, is mounted centrally in the sleeve (30). An impingement ring (36) extends around an inner circumference of the sleeve (30), near and below the peripheral edge (43) of the surface of the particulate deflector (40), such that particulates that flowed over the deflector (40) in a sheet impinge upon a reverse angled surface (38) of the ring (36). A load cell (76) is mechanically connected to the sleeve (30), and fixedly mounted to the outer housing (H), so that the load cell (76) measures any deflection caused by the flow of particulates over the deflector surface (42) and impingement on ring (36).

32 Claims, 4 Drawing Sheets

5,895,865

1

PARTICULATE MATERIAL FLOW MEASURING DEVICE

FIELD OF THE INVENTION

The invention relates to apparatus used for measuring the mass flow rate and total mass of particulate material. In particular, the invention provides a method and apparatus that measures mass flow rate instantaneously and supplies an electrical signal that can be used to control a metering pump for dosing a treatment chemical onto the particulates to provide a uniform dose of treatment chemical per mass of particulate material. Also, the invention can accurately measure the total mass of the particulate matter.

BACKGROUND OF THE INVENTION

In the handling of particulate material, it is sometimes required to accurately and continuously monitor the mass flow rate of the material. Such a need arises, for instance, when a treatment chemical is to be dosed onto the particulate material at a predetermined rate of a chemical per unit mass of the particulate material. Ideally, under these circumstances, the mass flow rate should be maintained as constant as possible, so that the dosage rate of treatment chemical may also be maintained at a constant rate. However, in practice, the mass flow rate of particulates tends to vary so that the dosage rate per unit mass also varies. This variation in dosage is particularly troublesome in those cases where the level of treatment chemical is specified by regulation. Clearly, variation of mass flow rate, while maintaining a constant dosage rate, increases the risk of overdosing portions of the flowing particulate material, and underdosing other portions as the mass flow rate varies.

In order to maintain uniform dosage of a treatment chemical onto a flowing mass of particulates, it is desirable to have a means for measuring the instantaneous mass flow rate accurately and precisely. Moreover, it is desirable to use this information to virtually instantaneously, and continuously, control a treatment chemical dosage pump so that the dosage rate is automatically adjusted to compensate for changes in the mass flow rate of particulates. Preferably, the apparatus for measuring the mass flow rate of the particulates should be robust, inexpensive, require little maintenance, and able to measure flow rates over the complete range of mass flow rates that are expected to be encountered.

It also is often necessary to accurately measure the total mass of particulate material. It can be extremely cumbersome to perform such measurement by the typical method of placing a quantity of the particulate matter in a receptacle for weighing on a scale. It would be much more convenient to simply measure the total mass of the particulate matter during a transfer process, for instance as a particulate matter is extracted from a storage unit. However, heretofore such flow measuring devices have not proven to be very accurate.

SUMMARY OF THE INVENTION

The invention provides an apparatus for not only measuring the mass flow rate of particulate solids, but also measuring the total mass of the particulate solids that has flowed past the apparatus. The apparatus is robust, requires little maintenance and may readily be installed or retrofitted onto existing systems where it is important to measure the mass flow rate of particulate solids. The apparatus is able to provide an electrical output signal that is proportional to the measured mass flow rate of the particulate solids, and that

2 can be used to control other devices that have operating rates dependent upon the mass flow rate, such as metering pumps that dose treatment chemicals into the particulate solids. By factoring the output signal over time, the total mass of the particulate solids can be determined.

The apparatus of the invention, a load scale, is mountable onto a vertical conduit through which the particulate solids flow. The load scale of the invention includes an outer vertical housing, preferably with a hinged door, that has a similar cross section to the conduit. The housing may be affixed to the upper end of the conduit through flanged connection. Inside the housing is a vertical sleeve that has a central axis of symmetry. The sleeve has an inlet for receiving particulates at its upper end, and an outlet for particulate exit at an opposite end. A feed manifold is located above the inlet end so that particulate feed is channeled through a funnel-shaped particulate feed hopper, through a slide-gate, and thence into the sleeve inlet. A particulate deflector, that has an outer surface with rotational symmetry about a vertical deflector axis that is shaped to spread a falling column of particles outward from a point of impact on its central apex into a sheet, is disposed centrally beneath the hopper in the sleeve. In one embodiment, the deflector has a cone-shaped outer surface with the apex oriented toward the inlet of the sleeve and a base proximal to the outlet of the sleeve. An impingement ring extends around an inner surface of the sleeve near, but below, the base of the particulate-spreading surface of the deflector so that after particulates flow over the deflector surface, the particulates impact an angled surface of the ring. A load cell is mechanically connected to the sleeve, and is fixedly mounted to the outer housing. Thus, the load cell measures any deflection of the inner sleeve that is caused by the mass of particulates flowing over the deflector surfaces. An electronic signal, proportional to the measured deflection, is generated and may be used to control associated equipment, such as chemical treatment pumps to adjust dosage rates of these chemicals in proportion to the detected mass flow rates of particulates.

One of the important features of the deflector is that it allows air to enter into a central portion of its base and exit in a region beneath the particulate-spreading surface to eliminate the formation of a low pressure zone in this region that may pull the falling sheet of particulates inward, away from the impingement ring. Structurally, the deflector includes an axial shaft in its base portion with air passages extending from the upper extremity of the shaft to outlets beneath the particulate-spreading surface. In general, the lower the density of the particulates, the larger the air flow, and hence the air passages, needed to counteract the low pressure effect.

The deflector is mounted on a deflector support that maintains the deflector in its vertically aligned and centered position directly beneath the hopper in the sleeve. In accordance with the invention, the deflector support is designed to minimize any adverse effect on the flow of the stream particulates and hence measurements of its mass. Thus, the support is located below the particulate-spreading surface and is, in one embodiment, in the form of a pair of planar, thin crossed brackets that support the deflector at their crossing central portions, with their lengths extending to the inner walls of the inner sleeve for support. The upper edges of the support brackets are rounded so that particulates readily slide over the upper surfaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The apparatus of the invention, including a load scale device, measures the mass flow of virtually all kinds of particulate solids, such as seeds or grains, organic particulates such as resin beads, mineral particulates, such as ore particulates, coal particulates, and the like. The structure of the apparatus, with reference to its preferred embodiments, will first be discussed, followed by an explanation of the operation of the apparatus.

Figure 1:
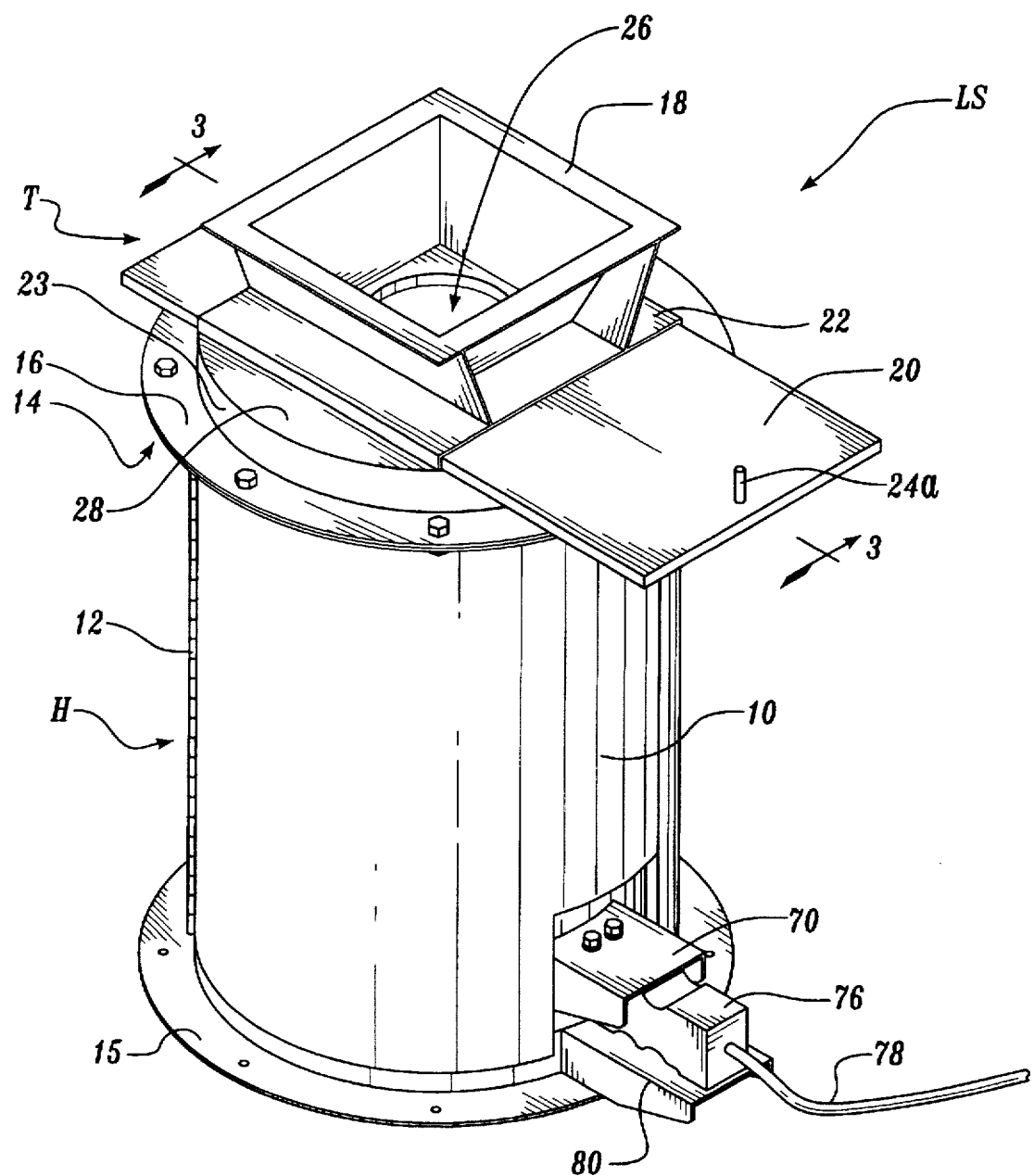
FIG. 1 is a perspective view of a preferred embodiment of the load scale of the invention.

In order to better appreciate the preferred embodiments of the invention, reference may be had to the attached FIGURES, although it will be appreciated that various changes can be made in this embodiment that are still within the scope of the invention as described and claimed herein. Referring to FIG. 1, the load scale LS has an exterior cylindrical housing H that is preferably of substantially the same diameter as a conduit on which it is to be mounted. The housing H is fitted with a hinged 12 door 10 to allow access to the interior of the housing. The housing has an upper circumferential flange 14, and a lower circumferential flange 15, the lower flange adapted for mounting the load scale onto a conduit through which the particulate solids flow. Thus, the load scale is readily retrofitted to existing equipment.

Figure 2:
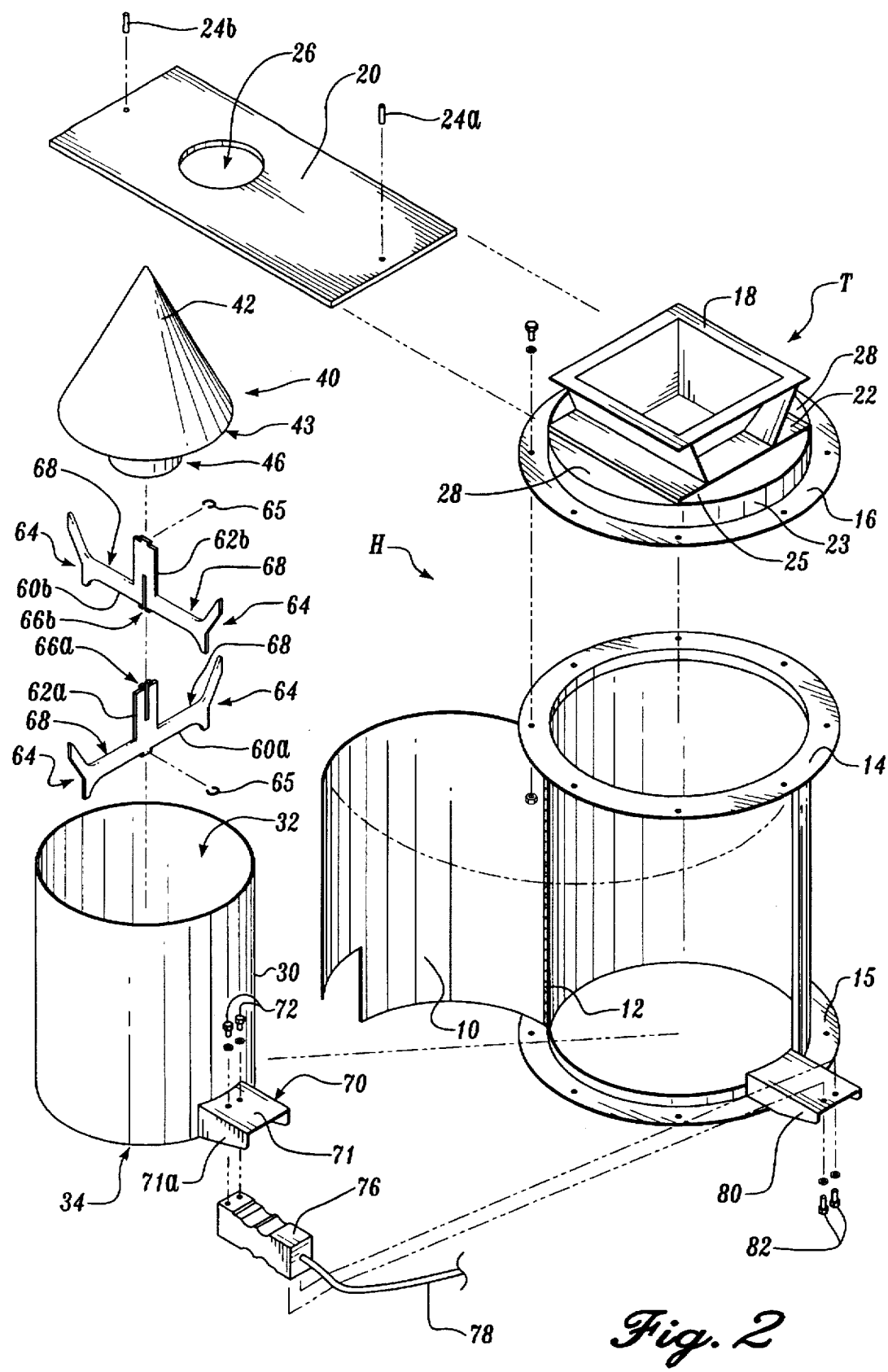
FIG. 2 is a schematic of an exploded view of the load scale of the invention, showing how various components interconnect.

A top feed assembly T is mounted to the housing H by flange 16 mating to the upper flange 14. The feed assembly T includes a particulate feed hopper 18, shown as a funnel-shaped hopper that presents a cross-sectional area for particulate flow that is substantially square. However, clearly, other funnel-shapes are also useful, as long as the particulate matter is funneled to a uniform circular opening 26 in a slide gate 20 mounted below the hopper that opens and closes the exit space at base of the hopper 18. As shown in FIGS. 1 and 2, the horizontal, rectangular slide gate 20 has handles, that also serve as stops, 24a and 24b at the ends of the gate to facilitate sliding of the gate 20, and also to prevent complete removal of the gate from its slot 25 between the base 22 of the hopper and the upper edge of the collar portion 23 of the flange 16. Since the slide gate of the embodiment shown is rectangular, and the collar portion 23 of the flange connection 16 is cylindrical, the gate slides across a circular opening in the top of the collar portion 23. To prevent dust and fine particulates from exiting from any intervening space between the longitudinal sides of the slide gate and the upper edge of the collar portion 23, the intervening space is sealed with horizontal roof portions 28. Thus, the upper portion of the housing, including the feed hopper, is sealed from the environment, and particulate solids enter the housing through the opening 26 of a diameter "i" when the slide gate 20 is in the open position.

Figure 3:
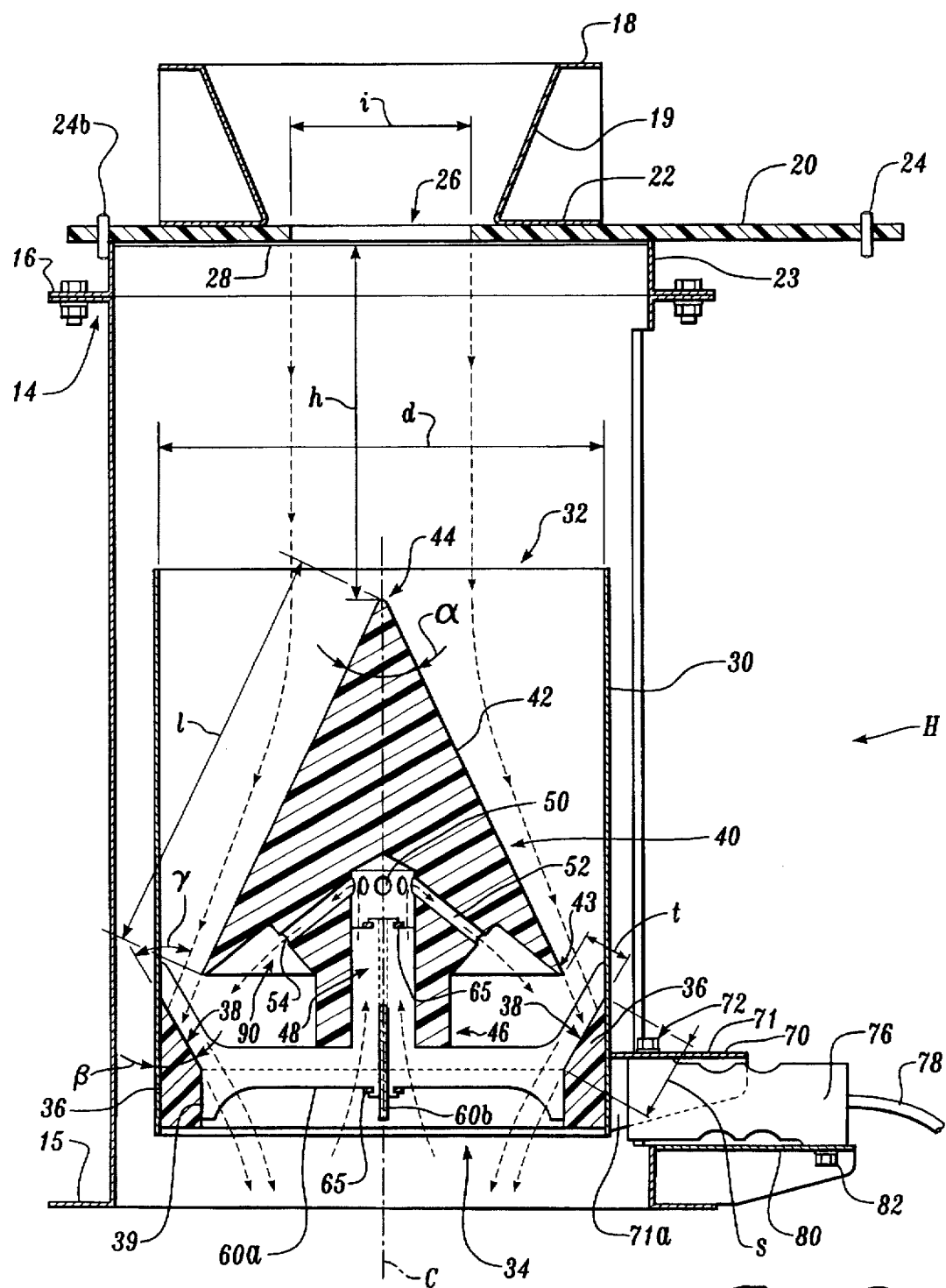
FIG. 3 is a cross-sectional view, taken at three-three of FIG. 1, of an embodiment of the load scale of the invention.

Referring to FIGS. 2 and 3, the housing H contains an inner sleeve 30. In a preferred embodiment the sleeve is generally cylindrical, with its longitudinal axis of symmetry C coincident with the longitudinal axis of symmetry of the housing H, that is also preferably cylindrical. Moreover, the center of the particulate feed opening 26 of the slide gate 20 coincides with the axis of symmetry C of the sleeve, when the slide gate is fully open and centered beneath the hopper 18. This structure permits a column of turbulent particulates to flow from the hopper, through the slide gate, and into the center of the sleeve.

A particulate solids deflector 40 is mounted in the sleeve 30 such that a vertical axis of symmetry of the outer surface 42 of the deflector, that is rotationally symmetrical about this axis, is substantially coincident with the axis of symmetry of the sleeve. The outer surface 42 has an upper end converging toward an apex 44 around its axis of symmetry, and flares outward and downward from the apex to a base. As shown, the outer surface 42 of the deflector 40 is preferably cone-shaped. Clearly, however, other shapes that meet the rotational symmetry (e.g., dome, hemisphere) requirement are also useful, as will become more apparent when its function of spreading a column of particulates into a layer of substantially uniform thickness around the surface is considered, as explained herein.

Preferably, the apex 44 of the deflector is rounded and the outer surface 42 is smooth to minimize friction with particulates flow over the outer surface. Moreover, the apex of the deflector is preferably spaced a distance "h" corresponding to one to two diameters "i" of opening 26 below the slide gate opening to permit formation of a columnar turbulent stream of falling particulates before reaching the deflector. If the vertical height "h" is too great, it is more difficult to align apex 44 with the center of the opening 26, which may cause the column of falling particulate solids to break up and become non-uniform.

The preferred deflector 40 has a central, reduced diameter cylindrical stem portion 46 that extends downwardly from under the particulate-spreading surface 42. A vertical counterbore 48 extends centrally upward through the stem portion 46 into the interior of the deflector, but not all the way through the deflector. A plurality of air passages 52 extend from inlet ends 50 in the upper end of the counterbore 48 diagonally downwardly and outwardly to outlet ends 54 in the base portion 46, preferably directly beneath the base of the surface 42. The counterbore-and-air passage arrangement is an important feature of the invention and prevents the creation of a region of negative air pressure directly beneath the surface 42 when particulates flow over the surface at high speed. The negative pressure is prevented by the continuous drawing of air into the counterbore 48 from the conduit below (not shown) to which the load scale is mounted, and expulsion of this air through the air passages 52 into a plenum region below the surface 42, thereby neutralizing any possibility of a suction force arising. As a consequence, the particulates flow smoothly over the surface 42 and continue to travel in an arc downward and outward when leaving the surface 42, as shown by the dashed lines and arrows in FIG. 3.

To further facilitate circulation of air beneath the deflector 40 to reduce any suction forces that could arise due to flow of particulates over the deflector, the deflector has a V-shaped undercut 90 extending circumferentially around stem portion 46, as shown in FIG. 3. The undercut 90 extends from the lowest extremity 43 of the deflector 40 upward, then downward (to form the "V"), and terminates at the deflector stem portion 46. It is to be understood that the undercut could be formed in other cross-sectional shapes without departing from the spirit or scope of the present invention.

Near the bottom outlet end 34 of the sleeve 30 and below the bottom peripheral edge 43 of the diverter outer surface 42, an internal impact ring 36, with a reverse angle surface 38, extends circumferentially along the inner surface of the sleeve. As shown, the ring 36 may be fabricated from an organic polymer. Preferably it has a smooth upper reverse angle surface 38 that extends from an upper edge adjacent the inner surface of the sleeve 30 at a location just below peripheral edge 43 of surface 42, inward and downward in the sleeve 30 at an acute angle β to the sleeve. Thus, the stream of particulate solids flowing over the surface 42 will impact the surface 38 of the ring at an angle γ to impose a load on the ring. The magnitude of the impact load will be a function of the density of the particulate material and the mass flow rate thereof. The impact ring smoothly deflect the particulate material inward and downward to slide off the surface 38 to exit from the load scale LS through the outlet 34. To this end, preferably the surface 38 extends downwardly a sufficient distance to redirect direction of flow of the particulate solids. Below surface 38, the impact ring includes a vertical section 39 extending downwardly o near the bottom of the sleeve 30.

The deflector cone 40 is supported in its centered and vertical position by a deflector mount that is preferably structured to minimize interference with particulate solids flowing through the load scale LS. In the embodiment shown, the deflector mount includes a pair of crossed, planar, relatively thin gauge brackets 60a and 60b. Each of the cross brackets has a substantially rectangular upright central section 62 formed with center vertical slots 66a and 66b formed therein. As shown most clearly in FIG. 2, the downwardly open slot 66a of bracket 60a engages the upwardly open slot 66b of bracket 60b, when the brackets are cross-wise engaged so that the upper edges 68 of the two brackets are coplanar. A pair of split rings 65 are used to pinch the grooves 66a and 66b closed, thereby locking the brackets 60a and 60b together in cross-wise configuration. Each of the ends 64 of the brackets 60a and 60b is shaped to conform to the inward surfaces of the internal ring 36. Thus, the ends of the crossed support brackets rest on the reverse angled surface 38 of ring 36 in a stable position and extend vertically downward along the lower vertical sides or cylindrical section 39 of the impact ring. The support brackets 60a and 60b are maintained in this position when particulates flow over the deflector 40, as shown in FIG. 3.

The deflector mount supports the deflector 40 through the central segments 62a and 62b of the brackets, each of which have a width closely corresponding to the internal diameter of the counterbore 48. Thus, when the brackets are connected together in cross-wise fashion, the crossed rectangular central segments fit snugly within the counterbore thereby assisting in holding the deflector in place on the support brackets. As shown in FIG. 3, the lower edge of the deflector stem 46 rests on the upper edges 68 of the brackets. Preferably, edges 68 are smoothly rounded so that particulate solids readily flow over these surfaces.

A rectangular mounting bracket 70 is attached to extend horizontally outwardly from the outer surface of the sleeve 30. The bracket 70 includes a horizontal mounting web 71 and down turned side flanges 71a for strength and rigidity. The bracket 70 is mounted to the load cell 76 with a pair of fasteners 72 extending through close fitting clearance holes formed in web 71 to engage threaded blind holes formed in the cantilevered end of the load cell. The entire assembly, including sleeve 30, impact ring 36, deflector 40, deflector support brackets 60a and 60b, and load cell 76 is then mounted to the housing H in cantilever fashion through attachment of the outward end of the load cell 76 to a bracket 80 extending radially outwardly from the base of the housing H, with fasteners 82 extending upwardly through the bracket 80 to engage threaded holes formed in the load cell. During operation of the load scale LS, an electronic output signal is carried from the load cell 76 through electrical cable 78 to a controller for devices, such as treatment chemical dosage pumps. It will be appreciated that by the foregoing construction, the present invention is capable of detecting minute increases and decreases in the dynamic loads imposed on the load scale of the flowing particulates.

During operation, particulates enter the load scale device of the present invention through feed hopper 18 and thence through the circular opening 26 in the open slide gate 20 in a turbulent columnar stream. This turbulent stream flows downward, in its substantially columnar shape, until it encounters the apex 44 of the deflector cone 40. At that point, the columnar shape is uniformly spread outward from its center over the spreading surface 42 of the deflector cone to form a conical layer of particulates of substantially uniform thickness measured around the cone at any distance from the apex. The layer thins as the particulates proceed down over the increasing surface area for flow. The shape of the layer of particulates approximates the shape of the cone surface 42. When the particulates flow over the lowest extremity or peripheral edge 43 of the deflector surface 42, the particulates fall freely in an arc for a short distance before impacting the smooth reverse-angled surface 38 of the impingement ring 36. This smooth surface receives the dynamic force of the falling particles and causes the particulates to change direction, i.e., directs the particulates inward, toward the center of the sleeve. The particulates then fall downward, out of the outlet 34 of the inner sleeve and into a conduit (not shown) on top of which the load scale LS is mounted, by means of flange 15.

It is believed that the present invention will provide more accurate results of substantially all of the particulates impacting the cone 40 are flowing in a substantially vertically downward direction upon impact. To this end, it may be necessary to add baffles to the pipe, chute or other type of conduit used to deliver the particulates to the hopper 18. In addition, it may be advantageous to add such baffles to the upper portion of housing h. Such baffles may take the form of vertical plates or walls that help direct the particulates in a vertically downward direction.

Preferably, the cone deflector is of unitary construction and is fabricated from (or coated with) an organic polymeric material that has a high lubricity, inherent damping characteristics and resistance to abrasive wear, i.e., has a low frictional coefficient and is hard, such as Teflon®. The apex angle α of the cone is preferably in the range from about 40° to about 60°, most preferably less than about 60°. The steep preferred cone apex angle α assists in gradually spreading (without bouncing) the particulates and orienting their flow from a columnar flow to a substantially uniform conical layer of particulates without imposing a significant dynamic friction or drag load on the deflector. As explained above, any tendency of the particulates to be drawn inward under the cone-shaped surface is countered by the counterbore and air passage arrangement. Moreover, the apex of the cone is preferably rounded to avoid damaging soft particulates but is still substantially pointed, having a radius of about ⅛ inch.

The cone-shaped deflector shown is exemplary of this embodiment of the invention and has the following most preferred dimensions, all given in terms of d, the diameter of the sleeve 30, for ready scale up/down to any size. The length 1 of the side of the cone-shaped surface 42 is preferably from about 0.9 d to about 1.1 d; and the distance t between the lower edge 43 of the deflector surface 42 and the reverse angled surface 38 of the ring 36 is preferably from about 0.10 d to about 0.20 d.

Similarly, the impingement ring 36 is preferably also fabricated from (or coated with) a low-friction plastic material that has high abrasion resistance and inherent damping characteristics so that particulate matter impacting on the surface 38 is deflected and then flows smoothly off the surface. These are important considerations since the force transmitted to the load cell 76 is dependent upon the mass flow rate of particulate solids through the load scale and any drag coefficient of the solids on surfaces 42 and 38. The acute angle β between the impact surface 38 of the ring and the sleeve 30 wall is preferably in the range about 20° to about 40°. Thus, particulates impact the ring at an angle γ preferably ranging from about 45° to about 65°. The length s of the reverse angled surface 38 is preferably from about 0.15 d to about 0.25 d.

The load scale of the invention is readily calibrated by flowing known masses of particulates through the scale at constant rates and measuring the load scale output signal for each mass rate. Thus, a relationship between mass flow rate and output signal is developed. This relationship may then be used to determine instantaneous mass flow rates based on the output signal, when the scale is in use. The total mass of the particulates that pass by the load scale may be continuously determined by factoring the mass flow rate over time of flow.

While the preferred embodiment of the invention has been illustrated and described, it will be appreciated that various changes can be made therein without departing from the spirit and scope of the invention. For example, rather than being cone shaped, the deflector 40 may be formed in a shape of a four or more sided pyramid. Correspondingly, the impact ring 36 may be shaped to match the shape of the deflector 40. In addition, the opening 26 of the slide gauge 20 also may be shaped to correspond to the shape of the deflector 40. The horizontal cross sectional shape of the sleeve 30 may also be formed to match the shape of the impact ring 36 and deflector 40. It is anticipated that by this construction it would be easier to enlarge the overall size of the present invention to accommodate larger flow rates of materials. Such pyramid shapes are easier to construct than the circular shapes shown in FIG. 3, especially as the components of the present invention are enlarged. It will be appreciated that by forming the deflector 40 in the shape of a pyramid, the deflector would remain symmetrical about the vertical axis of the deflector, but would no longer be rotationally symmetrical about such axis, since the corners of the pyramid extend further outwardly of such axis than the rest of the pyramid.

Figure 4:
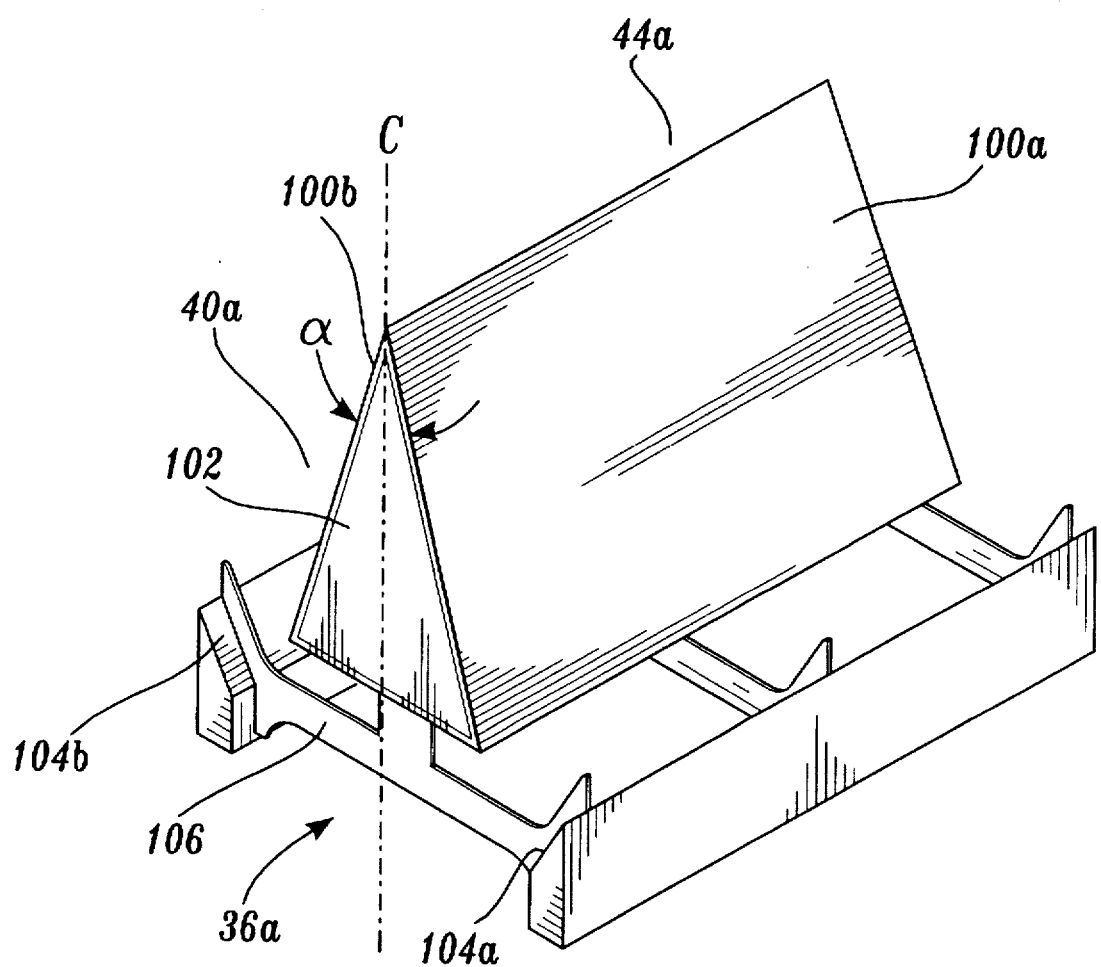
FIG. 4 is a partial perspective view of a further embodiment of the present invention.

A further possible preferred embodiment of the present invention is illustrated in FIG. 4 wherein a deflector 40a is illustrated as being in the form of an inverted "vee" or wedge having an upwardly extended edge apex 44a extending along the length of the deflector and an axis of symmetry C. As shown in FIG. 4, the deflector includes symmetrical sloped surfaces 100a and 100b and substantially vertical end surfaces or walls 102. The deflector 40a can be of solid construction or may be hollow depending on various factors, including the overall size of the deflector.

In the embodiment shown in FIG. 4, rather than having a circular impact ring 36, an impact member 36a would be composed of two longitudinal sections 104a and 104b located beneath and laterally of the lower edges of corresponding deflector surfaces 100a and 100b to thereby be in position to receive the particulate matter from the deflector surfaces. The deflector 40a can be supported relative to impact member 36a by an appropriate structure, for instance, by a series of brackets 106 that may be shaped similarly to brackets 60a and 60b, but rather being nested together in cross-cross fashion, the brackets 106 may be positioned along the length of deflector 40a and oriented transversely to the length of the deflector.

The embodiment of the present invention shown in FIG. 4 operationally would be very similar to the embodiment shown in FIGS. 1-3. However, the particulate material would flow only over sidewalls 100a and 100b of the deflector and not flow over the ends of the deflector. As such, substantially all (if not all) of the particulate matter would impact against the deflector and then the section of the impact member 36a, so as to provide an accurate indication of the mass flow rate of the particulate matter flowing over the deflector. If slide gate similar to slide gate 20 is used, preferably the opening in the slide gate would be rectangular rather than round in the manner of opening 26 of slide gate 20.

It is anticipated that one particular advantage of the embodiment of the present invention shown in FIG. 4 is that such embodiment may be readily enlarged to accommodate very high mass flow rates. The deflector 40a shown in FIG. 4 is believed to be less expensive and time consuming to construct in large sizes than a cone-shape deflector, such as deflector 40 shown in FIGS. 2 and 3.

Other modifications and changes can be made to the embodiments described above without departing from the present invention. For example, the deflector can be in the shape of an inverted "U" rather than in the shape of an inverted "V," the scope of the present invention as set forth in the accompanying claims, rather than being limited to the above description.

The embodiments of the invention in which an exclusive property or privilege is claimed are defined as follows:

1. An apparatus for measuring flow of particulate solids, the apparatus comprising:
   (a) an upright enclosure having a central axis of symmetry, the enclosure having an inlet for receiving particulates at an upper end, and an outlet for particulate exit at an opposite end;
   (b) a deflector disposed in and carried by the enclosure, the deflector having an upper apex and an outer surface extending longitudinally and laterally from the apex, the outer surface being symmetrical about the longitudinal central axis of the deflector, the deflector oriented with its apex directed toward the inlet of the enclosure;
   (c) an impingement ring supported by the enclosure, the ring extending substantially around the deflector at an elevation at least partially below the elevation of the deflector such that after particulates flow over the deflector, the particulates impact the ring and the load imposed on the impingement ring by the particulates is transferred to the enclosure; and
   (d) a load cell connected to the enclosure to measure the load applied to the impingement ring by the particulate solids flowing through the apparatus.

2. The apparatus of claim 1, wherein the deflector has a rounded apex tip.

3. The apparatus of claim 1, wherein the deflector is formed in a shape selected from the group consisting of a cone, a dome, a hemisphere and a pyramid.

4. The apparatus of claim 1, wherein the impingement ring has a smooth impact surface, the surface sloping inward and downward at an acute angle from the interior of the enclosure.

5. The apparatus of claim 4, wherein the acute angle of the impact surface is in the range from about 20° to about 40°.

6. The apparatus of claim 1, wherein the deflector has air passages extending from an air supply source outside of the deflector to a location beneath the outer surface of the deflector.

7. The apparatus of claim 1, wherein the enclosure is mounted in a conduit for carrying particulates, the conduit having a feed hopper above the deflector, the feed hopper having an opening sized and located such that, when the opening is opened and particulates are released from the hopper, particulates flow from the hopper over the cone-shaped deflector.

8. The apparatus of claim 1 wherein an apex angle of the apex of the deflector is from about 40° to about 60°.

9. The apparatus of claim 1, further comprising a support structure carried by the enclosure for supporting the deflector from a location beneath the outer surface of the deflector.

10. The apparatus of claim 9, wherein the support structure comprises a pair of crossed, substantially planar brackets, the brackets each comprising:

(a) a central planar, vertically extending wall-segment adapted for cooperating with another wall-segment of another of the pair of brackets to lock the brackets together, the wall-segments sized to be receivable within a counterbore extending upward into the base portion of the deflector; and (b) opposite ends shaped to cooperate with and engage the impingement ring.

11. The scale of claim 10, wherein the brackets have rounded upper edges to allow smooth flow of particulates over the upper edges of the brackets.

12. The apparatus of claim 1, wherein the load cell is connected to the enclosure to measure the combined load applied to the deflector and the impingement ring by the particulate solids flowing through the apparatus.

13. A load scale for measuring flow of particulate solids, the scale comprising:

(a) a deflector having a substantially outer surface extending longitudinally and laterally from an upper tip portion to a lower base portion with the outer surface symmetrical about the longitudinal axis of the deflector;

(b) a sleeve concentric with and surrounding the deflector, the sleeve comprising a ring extending around an inner surface thereof, the ring located adjacent the base portion of the deflector so that particulates flowing over the outer surface of the deflector impact the ring;

(c) a deflector support extending from the vicinity of the base portion of the deflector to engage the ring, so that the ring supports and carries the deflector support and the deflector in the sleeve; and (d) a load cell attached to the sleeve, the cell able to measure the combined load applied to the deflector and to the ring when particulates flow over the outer surface of the deflector and impact the ring.

14. The scale of claim 13, wherein the deflector comprises at least one passageway extending upward in the base portion of the deflector, and then extending laterally to outside the deflector, the at least one air passage exiting at a location beneath the cone-shaped surface of the deflector.

15. The scale of claim 13, wherein the deflector is formed in a shape selected from the group including a cone, a pyramid, a dome, and a hemisphere.

16. The scale of claim 13, wherein the tip of the deflector is rounded.

17. The scale of claim 13, wherein the ring has a smooth surface for particulate impact, the surface sloping inward and downward at an acute angle from an upper edge adjacent the interior of the sleeve.

18. The scale of claim 17, wherein the acute angle is from about 20 to about 40 degrees.

19. The scale of claim 13, wherein the outer surface of the deflector has an apex angle $\alpha$ in the range from about 40 to about 60 degrees.

20. An apparatus for measuring the flow of particulate solids, the apparatus comprising:

(a) a deflector configured to spread a columnar stream of particulates incident therein into a layer of particulates, the outer surface forming an apex at an upper extremity of the deflector and flaring outward to a base portion of the deflector;

(b) an impingement member extending along the base portion of the deflector, the impingement member having portions located below the base portion of the deflector such that when the layer of particulates flows over the deflector surface, the layer impinges the impingement member;

(c) a deflector support extending from the deflector relative to the impingement member to transfer forces imposed on the deflector by the flowing particulate to the impingement member; and (d) a load sensor associated with the impingement member to measure the impact load applied to the impingement member by the particulates, when the particulates flow over the deflector and impact against the impingement member.

21. The apparatus of claim 20, wherein the deflector comprises an access of symmetry coincident with its longitudinal axis.

22. The apparatus of claim 20, wherein the outer surface of the deflector is in the shape selected from a group consisting of a cone, a hemisphere, a dome, and a pyramid, an inverted V-shape and an inverted U-shape.

23. The apparatus of claim 20, wherein the impingement member has a smooth inward surface for particulate impact, the surface sloping inward and downward at an acute angle.

24. The apparatus of claim 23, wherein the acute angle of the smooth surface of the ring ranges from about 20 to about 40 degrees from the axis of symmetry of the deflector.

25. The apparatus of claim 20, wherein the deflector support comprises at least two substantially planar brackets disposed transversally to the direction of flow of the particulate solids, the brackets each comprising:

(a) a central upright segment sized for cooperation with a cavity formed in the deflector; and (b) opposite ends shaped to cooperate with and engage the impingement member so that the impingement member supports the bracket.

26. The apparatus of claim 20, wherein the deflector surface comprises a sloped surface with an apex angle of from about 40 to about 60 degrees.

27. The apparatus of claim 20, wherein the deflector comprises at least one counterbore in a base portion of the deflector with at least one air passage extending from the counterbore to an exit hole beneath the surface of the deflector.

28. The apparatus of claim 26, wherein the deflector support engages the counterbore.

29. The apparatus of claim 20, wherein the outer surface of the deflector is substantially in the shape of an elongated, inverted V, the deflector including two sloped side surfaces extending downwardly from an elongated apex edge extending substantially transversely to the columnar stream of particulates.

30. The apparatus according to claim 29, wherein the impingement member includes an impingement member section associated with and extending along the base portion of each of the two side surfaces of the deflector, the impingement member sections located below the bottoms of the side surfaces of the deflector such that when the particulates flow over the deflector side surfaces, the particulates impinge the impingement member sections.

31. The apparatus according to claim 29, wherein the deflector has substantially vertical end walls.

32. The apparatus of claim 20, wherein the load sensor measures the impact load applied to the deflector by the particulates flowing over the deflector and the impact load applied to the impingement member by the particulates impacting against the impingement member.

* * * * *